US012138493B2

(12) United States Patent
Contreras

(10) Patent No.: US 12,138,493 B2
(45) Date of Patent: Nov. 12, 2024

(54) ADHERING FACE MASK

(71) Applicant: Jorge Alberto Contreras, Rocky Hill, CT (US)

(72) Inventor: Jorge Alberto Contreras, Rocky Hill, CT (US)

( * ) Notice: Subject to any disclaimer, the term of this patent is extended or adjusted under 35 U.S.C. 154(b) by 0 days.

(21) Appl. No.: 18/453,557

(22) Filed: Aug. 22, 2023

(65) Prior Publication Data

US 2024/0066332 A1 Feb. 29, 2024

Related U.S. Application Data

(60) Provisional application No. 63/400,358, filed on Aug. 23, 2022.

(51) Int. Cl.
*A62B 18/00* (2006.01)
*A62B 18/02* (2006.01)
*A62B 18/08* (2006.01)

(52) U.S. Cl.
CPC .......... *A62B 18/025* (2013.01); *A62B 18/084* (2013.01)

(58) Field of Classification Search
CPC ............................ A62B 18/025; A62B 18/084
See application file for complete search history.

(56) References Cited

U.S. PATENT DOCUMENTS

2017/0065838 A1* 3/2017 Bunge .................. A62B 18/084
2021/0353973 A1* 11/2021 Bhat .................... A62B 18/025
2021/0379411 A1* 12/2021 Daeffler ................. A62B 23/02
2022/0000195 A1* 1/2022 Minnette ................ A41D 13/11
2022/0047896 A1* 2/2022 Salvino .............. A41D 13/1138
2022/0241623 A1* 8/2022 Ellison ................. A62B 23/025
2023/0142434 A1* 5/2023 Szasz ..................... A62B 23/02 128/206.12
2023/0338755 A1* 10/2023 Langenwalter .... A41D 13/1107

* cited by examiner

*Primary Examiner* — Steven O Douglas

(57) ABSTRACT

The adhering face mask is a device that allows the user to breathe filtered air without discomfort. It adheres to user's face with an adhesive gasket and creates a seal. The adhesive face mask creates an air pocket for the user preventing the mask from rubbing against the user's face. The filter housing gasket maintains a sealed air pocket when the filter housing assembly is attached. It comprises a filter housing assembly that uses a set of magnets embedded in its body to attach to a matching set of magnets embedded in the adhering face mask body. It comprises a filter cartridge that adheres to the filter housing assembly and filters different kinds of air quality.

10 Claims, 9 Drawing Sheets

ADHERING FACE MASK

CROSS REFERENCE TO RELATED APPLICATIONS

Provisional application No. 63/400,358

STATEMENTS REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A READ-ONLY OPTICAL DISC, AS TEXT FILE OR AN XML FILE VIA THE PATENT ELECTRONIC SYSTEM

Not Applicable.

STATEMENT REGARDING PRIOR DISCLOSURES BY THE INVENTOR OR A JOINT INVENTOR

Not Applicable.

BACKGROUND OF THE INVENTION

The field of the invention relates to face masks which have been used for filtering air for the user. The problem with these face masks is that they're inefficient and don't provide adequate protection. In addition to this there is added discomfort to the ears, head, and face from wearing these face masks for extended periods of time. There are usually skin reactions from the different types of materials that they are made of.

BRIEF SUMMARY OF THE INVENTION

The adhering face mask creates an air pocket in between the mask and the user's face, allowing the user to breathe in comfort. The back side of the adhering face mask is in the shape of a facial profile. The adhesive gasket assembly body matches the facial profile and bonds with the adhering face mask creating a seal.

The adhesive gasket assembly is comprised of an adhesive gasket assembly body, and double-sided adhesive strips that adhere the mask to the user's face. The front side of the adhering face mask is embedded with a set of magnets. The filter housing gasket is bonded to the front side of the adhering face mask creating a seal. The filter housing assembly is comprised of a set of matching magnets embedded in the back side of the filter housing assembly and houses a filter cartridge. The filter housing assembly attaches and detaches from the adhering face mask body using the sets of magnets magnetic force. This embodiment of the invention provides adequate protection to the user by having seals that prevent unfiltered air from getting inside the air pocket. It solves the problem of user discomfort by adhering directly to the user's face.

1. Adhering Face Mask.
2. Adhesive Gasket Assembly.
3. Double-Sided Adhesive Strips
4. Filter Housing Gasket.
5. Filter Cartridge front.
6. Filter Cartridge back.
7. Filter material.
8. Filter Housing Assembly.
9. Magnet.
10. Magnet.
11. Magnet.
12. Magnet.

DETAILED DESCRIPTION OF THE INVENTION

Figure 1:
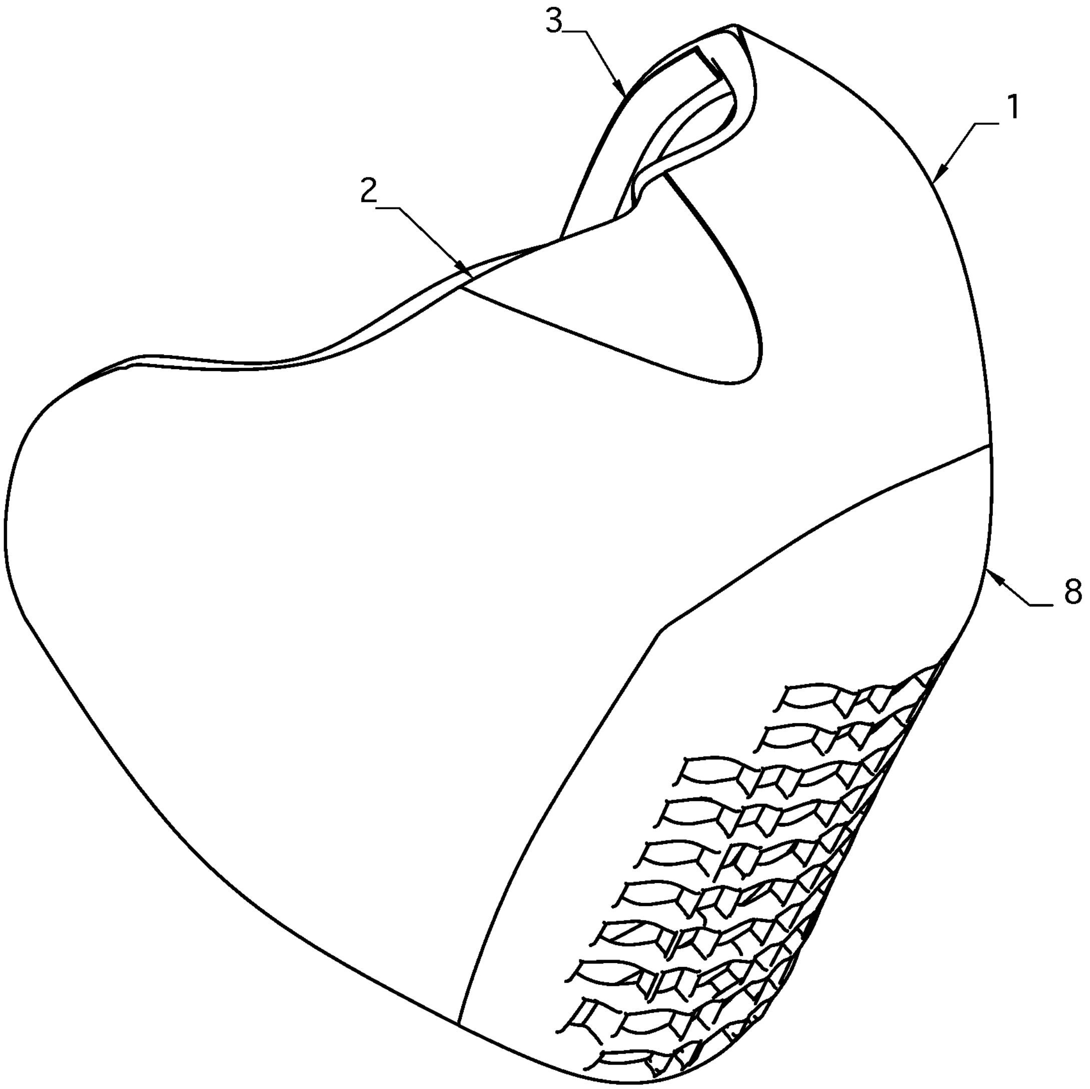
FIG. 1 is an isometric view of the adhering face mask.
Figure 2:
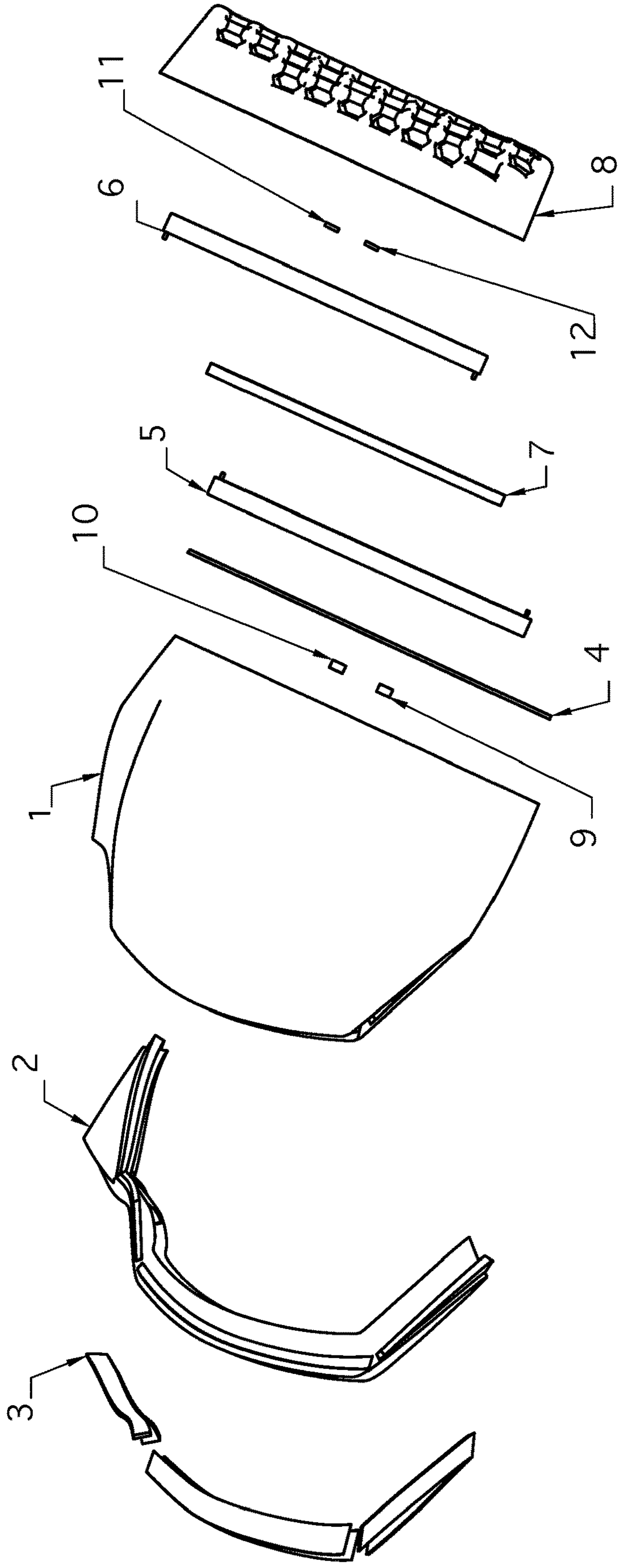
FIG. 2 is an exploded view of the adhering face mask and all its components.
Figure 3:
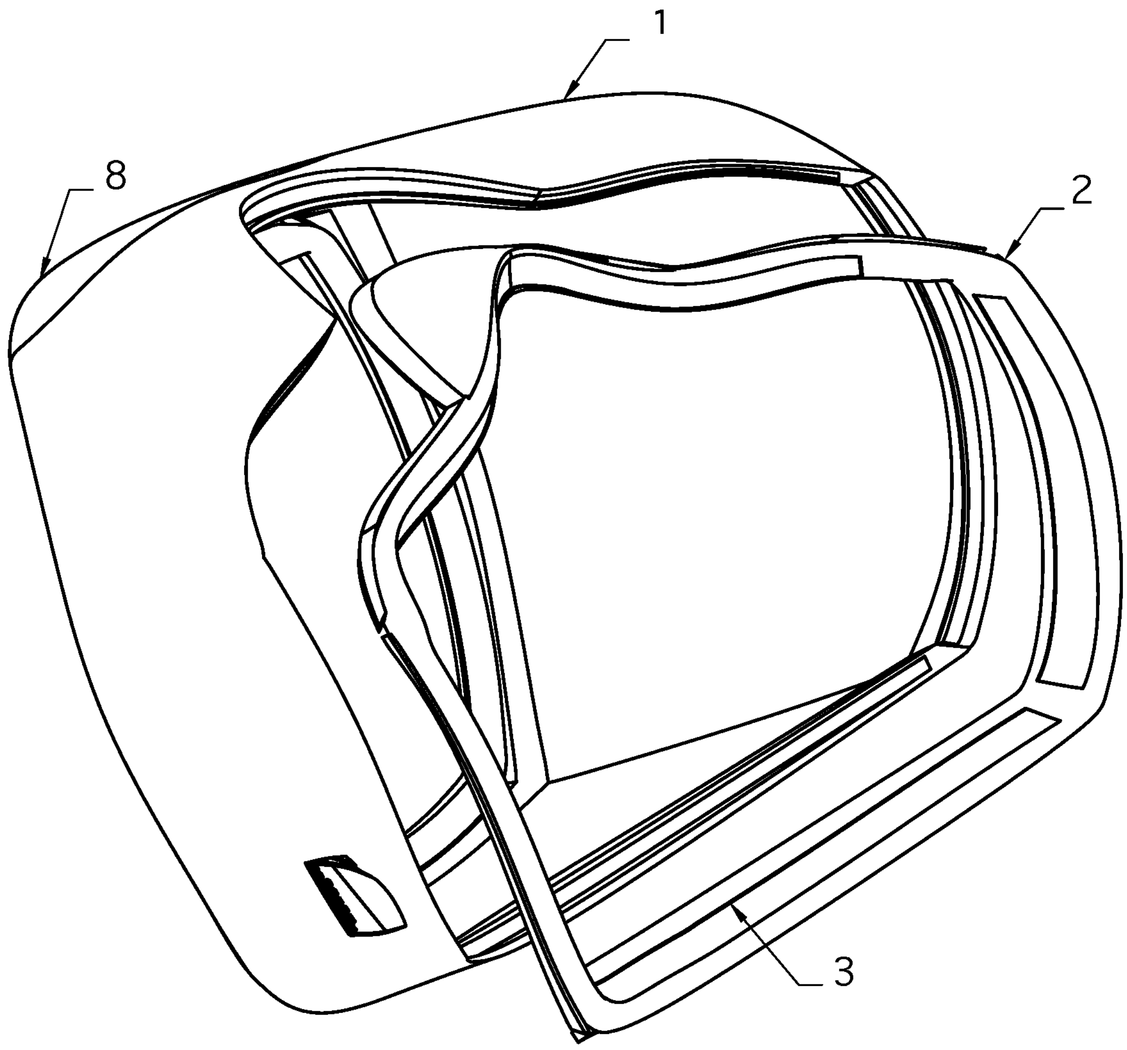
FIG. 3 is an isometric exploded view showing the adhesive gasket assembly matching up to the back side of the adhering face mask.
Figure 4:
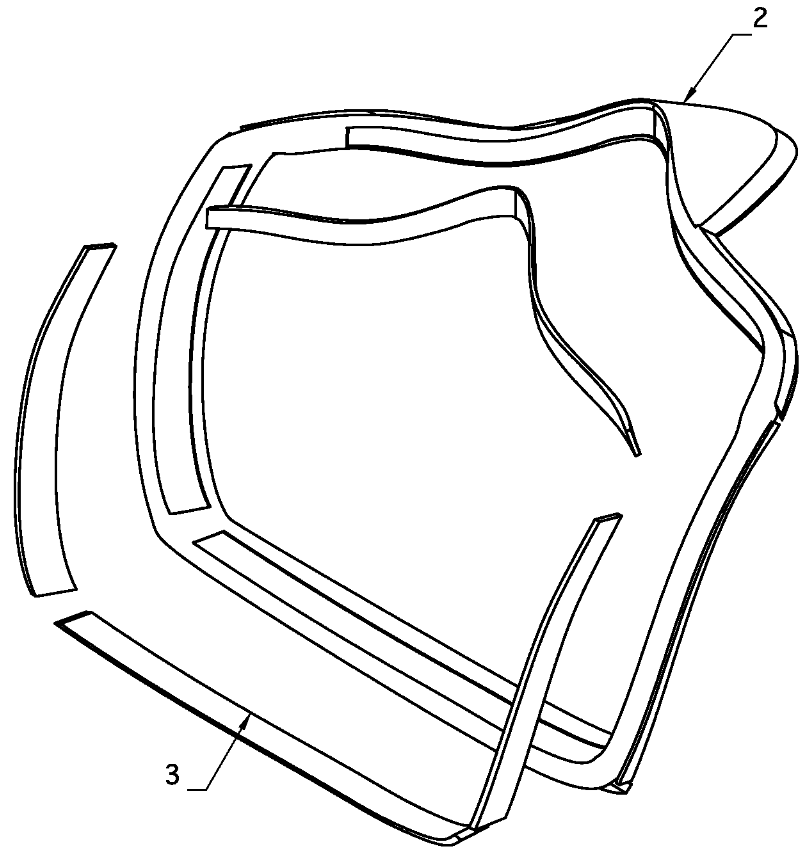
FIG. 4 is an isometric exploded view of the adhesive gasket assembly with the double-sided adhesive strips in the shape of sections of the facial profile.
Figure 5:
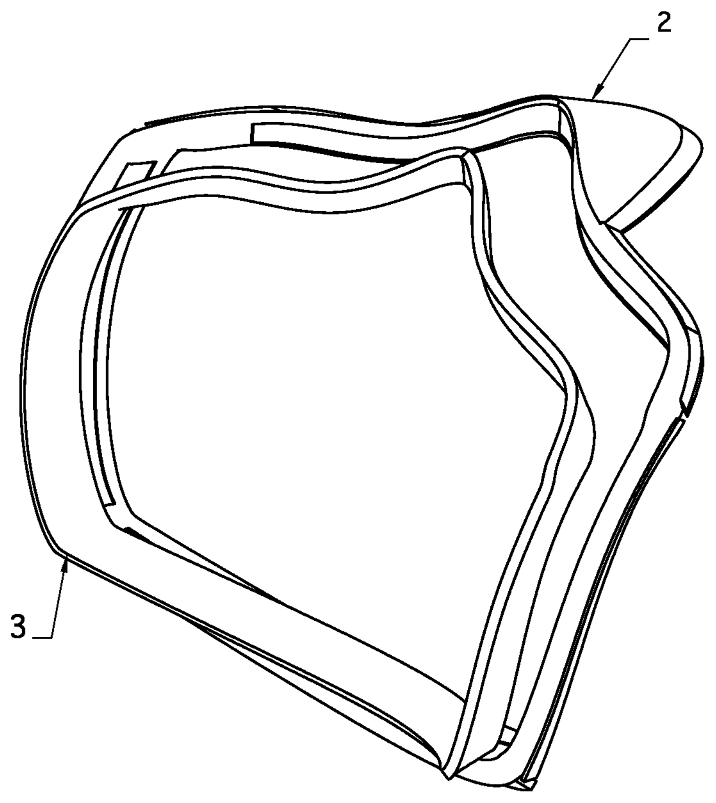
FIG. 5 is an isometric exploded view of the adhesive gasket assembly with the double-sided adhesive strip in the shape of a facial profile.
Figure 6:
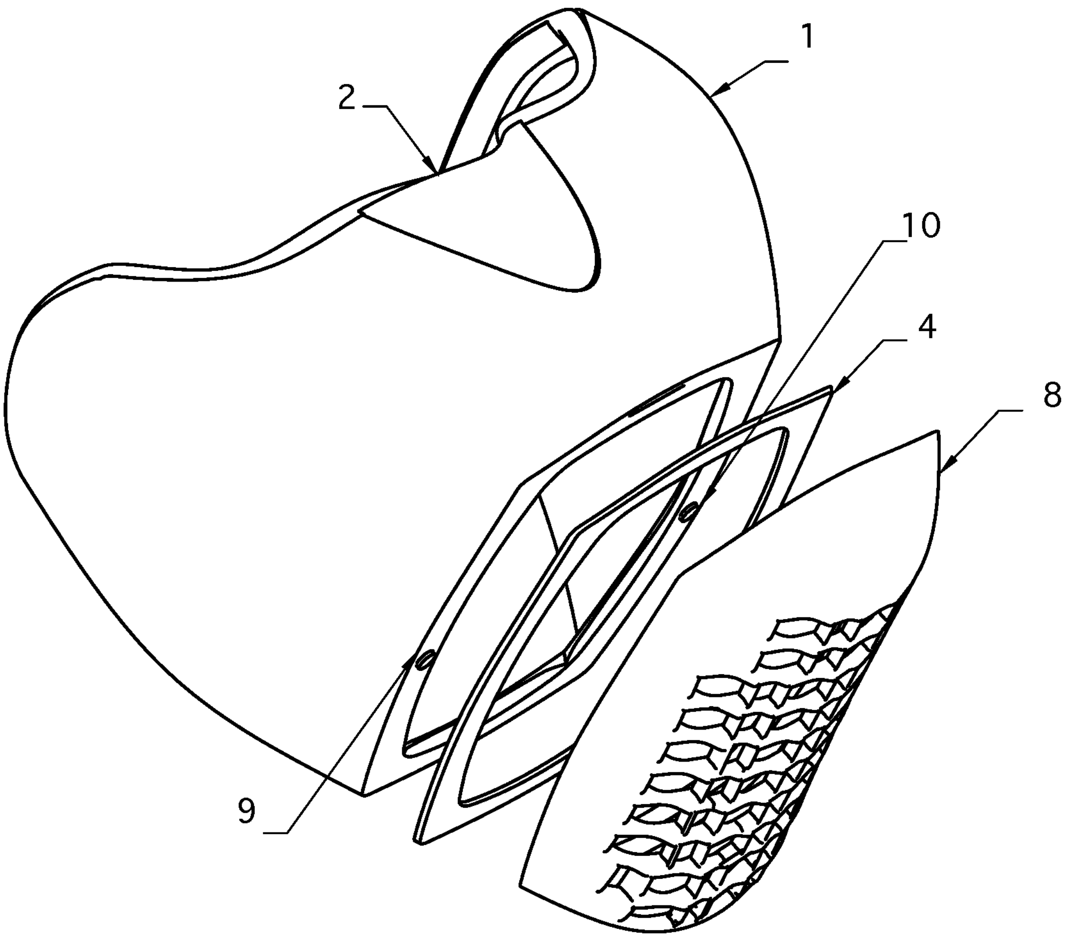
FIG. 6 is an isometric exploded view of the filter housing gasket matching up to the front side of the adhering face mask.
Figure 7:
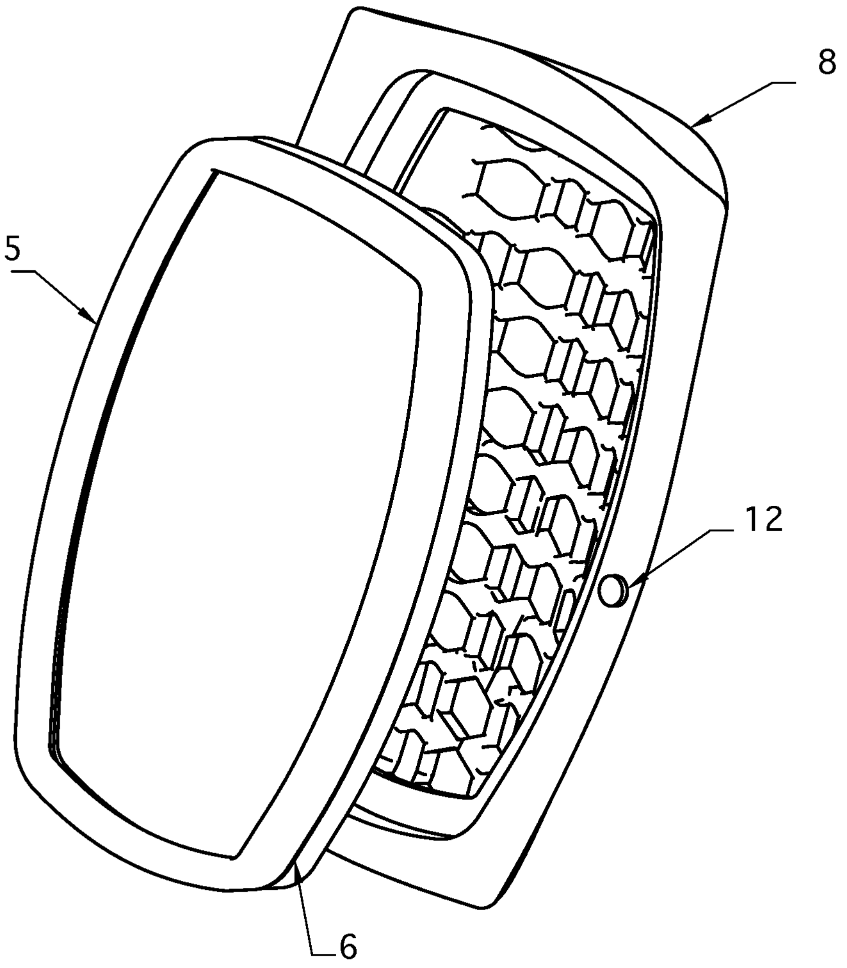
FIG. 7 is an isometric exploded view of the filter housing assembly housing the filter cartridge.
Figure 8:
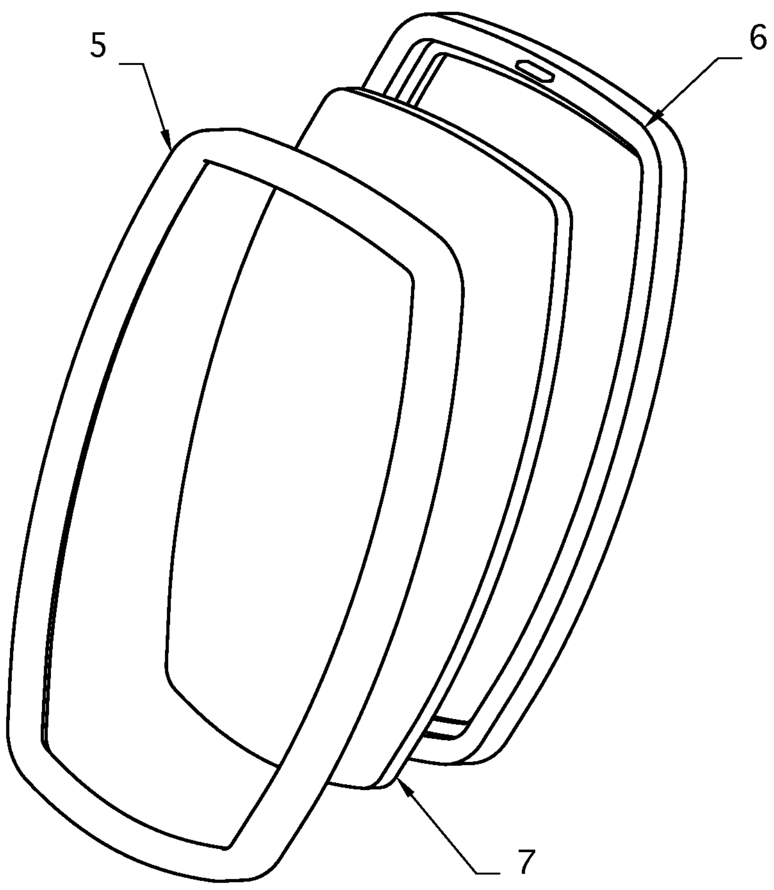
FIG. 8 is an isometric exploded view of the filter cartridge.
Figure 9:
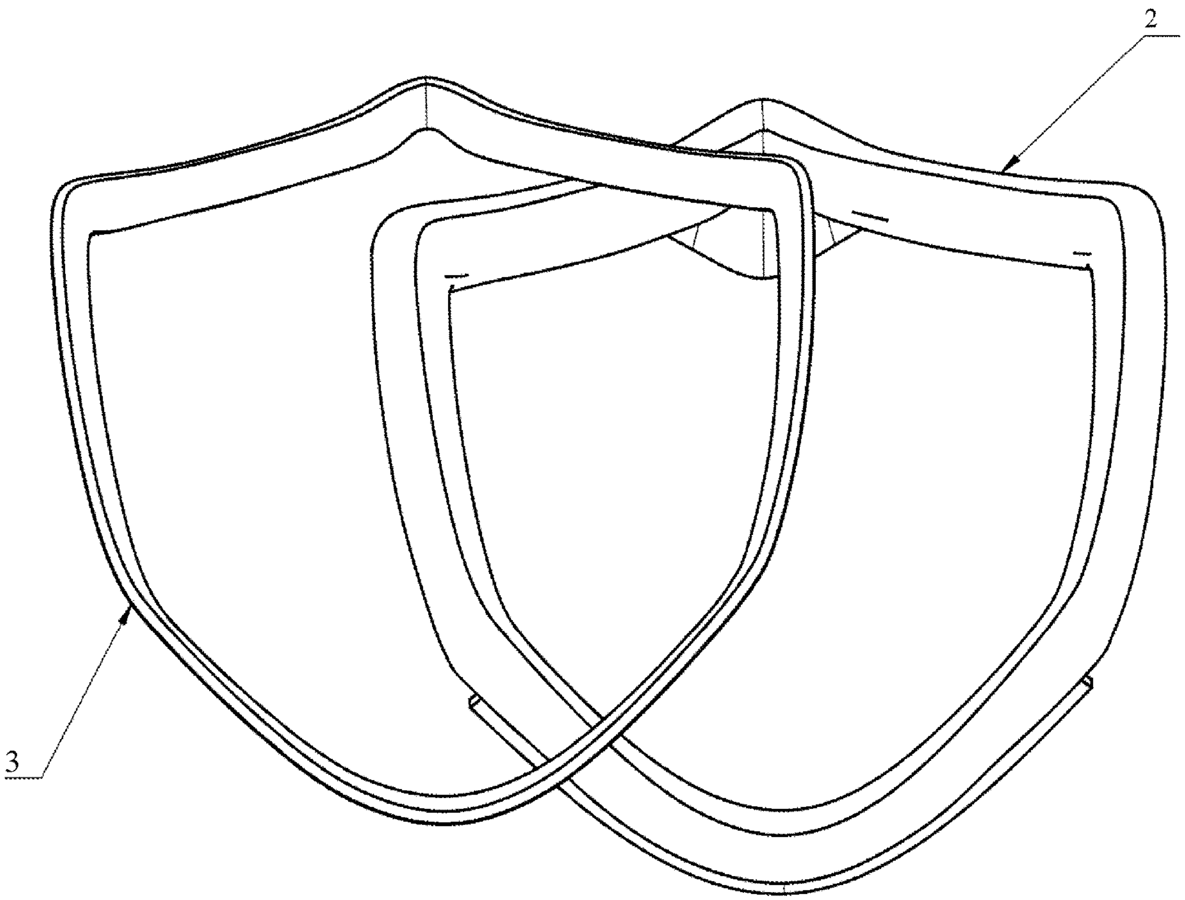
FIG. 9 Is an isometric exploded view from a different angle of the adhesive gasket assembly with the double-sided adhesive strips in the shape of a facial profile.

I will now describe the invention in more detail with reference to the drawings. The adhering face mask FIG. 1 is comprised of an adhering face mask 1. With a back side in the shape of a facial profile. It has an adhesive gasket assembly 2 that matches the back side facial profile and is bonded to it on one side. On the other side the gasket assembly 2 has a set of double-sided adhesive strips 3 that can be made in sections of the facial profile and in the completed shape of the facial profile FIG. 5. The front of the adhering face mask 1 is embedded with a set of magnets 9-10, that align to a set of magnets 11-12 that are embedded in the back of the filter housing assembly 8. The filter housing gasket 4 is bonded to the front side of the adhering face mask 1. The filter housing assembly 8 contains a hole pattern in the front side to let air in, and a slotted profile in the back side to house the filter cartridge 5-7. The filter housing assembly detaches and attaches to the adhering face mask 1 using the magnetic force from the sets of magnets 9-10 and 11-12. The filter cartridge is composed of a filter cartridge front 5, and a filter cartridge back 6, with a filter material 7 bonded in between both sides of the filter cartridge. An adhesive is applied to the exposed side of the filter cartridge back 6 in order to attach the filter cartridge to the slotted profile on the filter housing assembly 8.

The invention claimed is:

1. An adhering face mask with a front side and a back side that adheres to the user's facial profile comprising:

a. a facial profile on the back side, and a set of magnets embedded on the front side of the adhering face mask, b. an adhesive gasket assembly bonded to the back side of the adhering face mask, c. a filter housing gasket that's bonded to the front side of the adhering face mask, d. a filter housing assembly with a front side and a back side that attaches to the front side of the adhering face mask using a set of magnets embedded in the back side of the filter housing assembly, e. a filter cartridge that attaches to a slot in the filter housing assembly.

2. The adhering face mask of claim 1 further characterized for having an adhesive gasket assembly made out of a silicone-based material.

3. The adhering face mask of claim 2 further characterized for having an adhesive gasket assembly with one side in a shape of a facial profile, and the other side matching the profile on the back side of the adhering face mask.

4. The adhering face mask of claim 3 further characterized for having double sided adhesive strips that attach to and detach from the adhesive gasket assembly.

5. The adhering face mask of claim 4 further characterized in that the double-sided adhesive strips have the shape of a human facial profile.

6. The adhering face mask of claim 5 further characterized in that the double-sided adhesive strips are made of a silicone based-adhesive material.

7. The adhering face mask of claim 1 further characterized in that the filter housing gasket is made of a silicone-based material and bonded to the front side of the adhering face mask.

8. The adhering face mask of claim 1 further characterized in that the filter housing gasket is made of a silicon-based material bonded to the back side of the filter housing assembly.

9. The adhering face mask of claim 1 further characterized in that the filter housing assembly is composed of, a. a set of magnets embedded in the back side of the filter housing assembly that are aligned and attach to a set of magnets embedded in the front side of the adhering face mask, b. a hole pattern of any shape on the front side that allows air to flow in, and a filter cartridge slot on the back side.

10. The adhering face mask of claim 1 further characterized in that the filter cartridge is comprising of a. a filter cartridge front, b. a filter cartridge back, c. a filter material located between the two sides of the filter cartridge.

* * * * *